June 29, 1954
L. J. H. BALLINGER
2,682,150
FLUID PRESSURE SYSTEM FOR SEQUENTIALLY
OPERATED FLUID PRESSURE MOTORS
Filed June 27, 1952
4 Sheets-Sheet 1
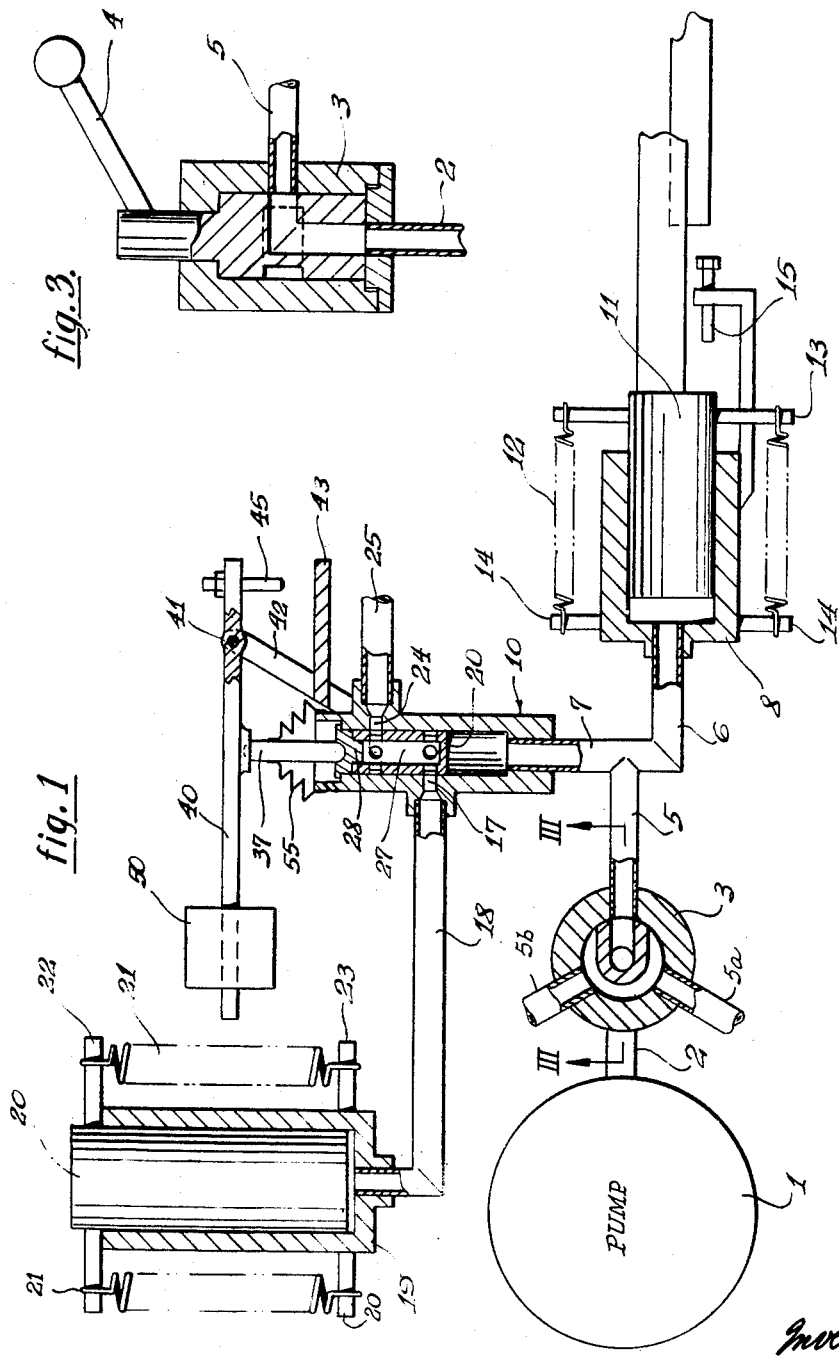

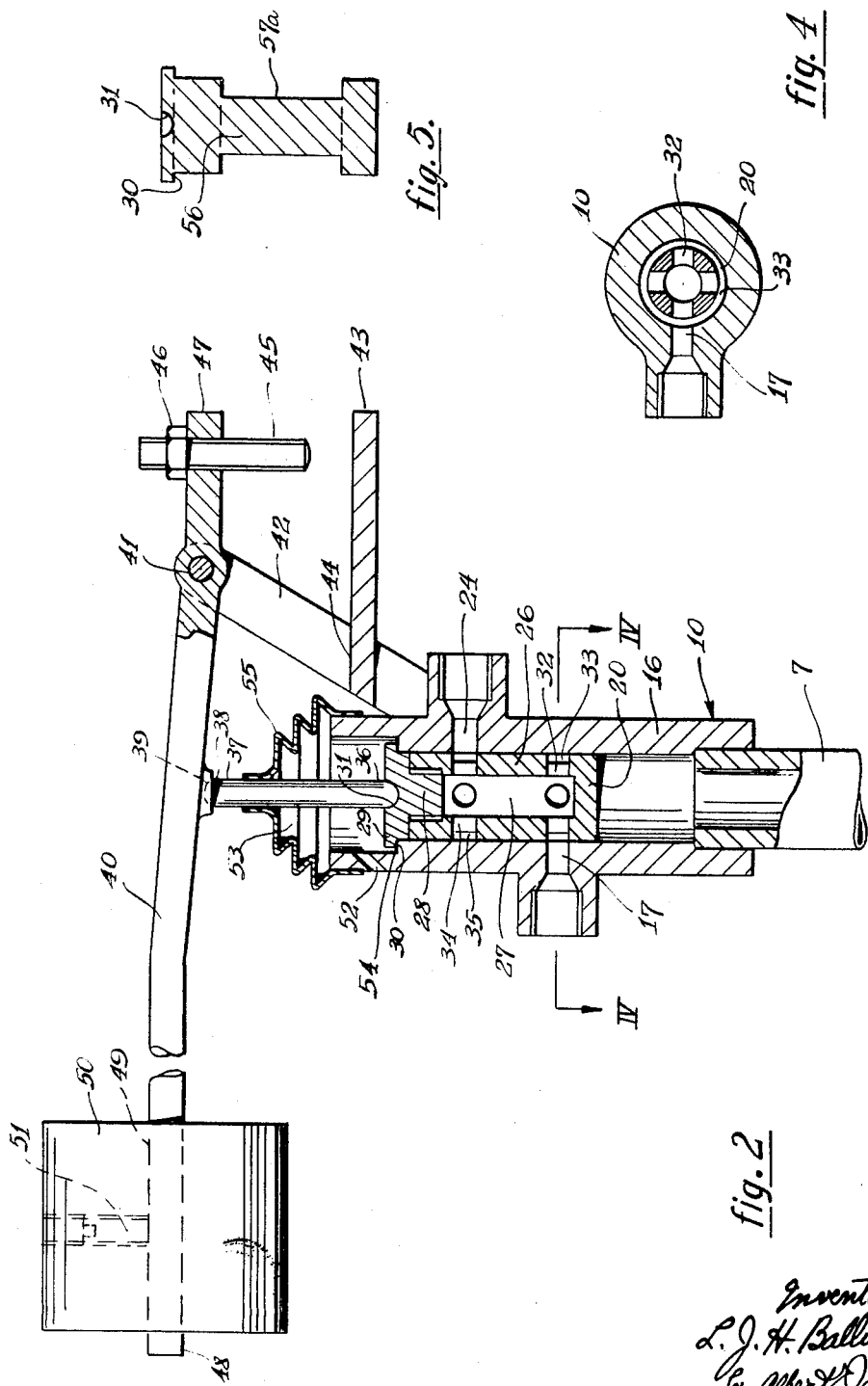

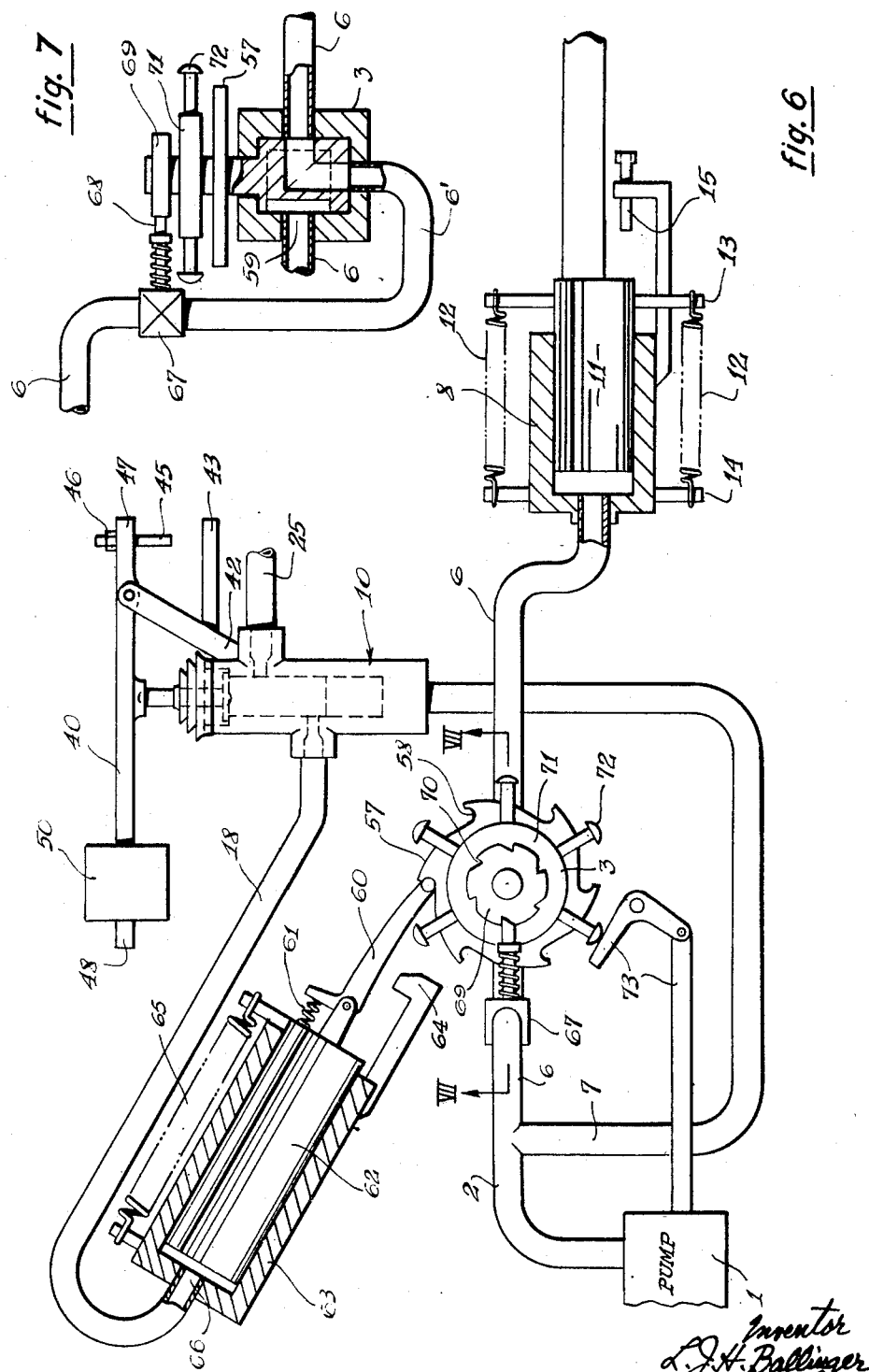

June 29, 1954     L. J. H. BALLINGER     2,682,150
FLUID PRESSURE SYSTEM FOR SEQUENTIALLY
OPERATED FLUID PRESSURE MOTORS
Filed June 27, 1952     4 Sheets-Sheet 4
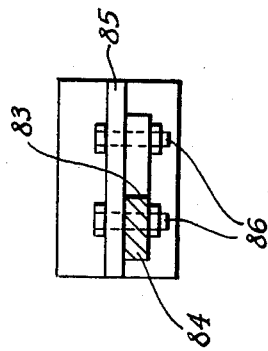
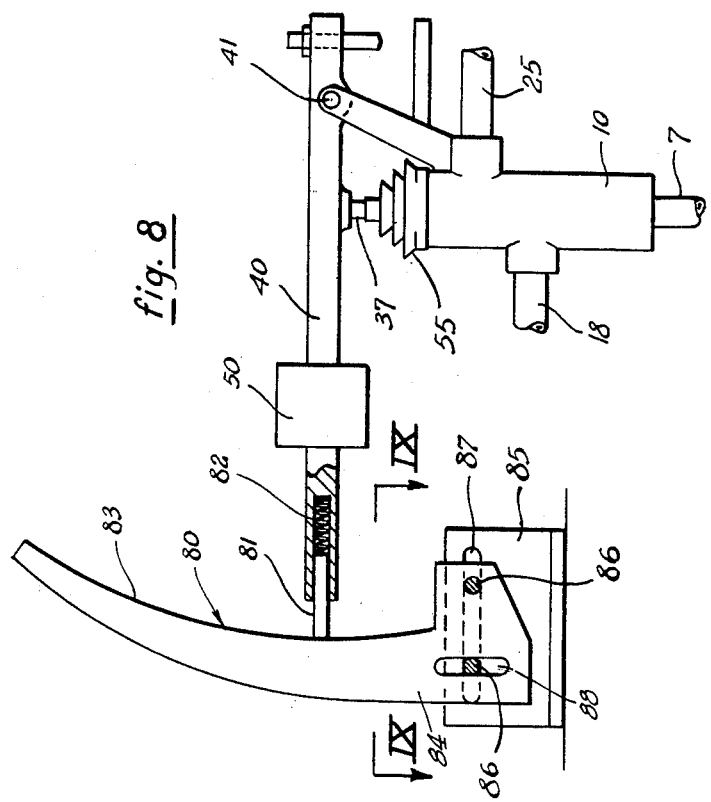
Inventor
L. J. H. Ballinger
By Albert L. Jacobs
atty.

Patented June 29, 1954

2,682,150

UNITED STATES PATENT OFFICE 2,682,150

FLUID PRESSURE SYSTEM FOR SEQUENTIALLY OPERATED FLUID PRESSURE MOTORS

Lewis John Howell Ballinger, Randwick, near Stroud, England

Application June 27, 1952, Serial No. 295,957

7 Claims. (Cl. 60—97)

This invention relates to combined sequence and unloading valves for fluid pressure systems and to fluid pressure systems employing such valves and has for its object to provide improvements therein whereby two cylinders can be operated one after the other from a single valve.

Now in accordance with the present invention I provide a combined sequence and unloading valve for fluid pressure systems wherein a lever arrangement controls a predetermined pressure, on the development of which pressure a valve piston is displaced so as to allow fluid through the valve cylinder, and on the fluid pressure being lowered in the system, the valve piston returns towards its original position.

In accordance with the present invention I provide a combined sequence and unloading valve for fluid pressure systems wherein a lever arrangement, force controlled, controls a valve piston subject to the action of a force controlled fluid pressure release piston arrangement and a storage valve piston arrangement to control the flow of fluid through the first-mentioned valve.

The invention is illustrated by way of example merely in the accompanying drawings, wherein:

Fig. 1 is a diagrammatic sectional elevation of one form of fluid pressure system;

Fig. 2 is a sectional elevation on an enlarged scale of the combined sequence and unloading valve used in the system;

Fig. 3 is a sectional elevation on the line III—III, Fig. 1, of the control valve of the system;

Fig. 4 is a transverse section of the combined sequence and unloading valve on the line IV—IV, Fig. 2;

Fig. 5 is a sectional elevation of an alternative piston for the combined sequence unloading valve;

Fig. 6 is a diagrammatic sectional elevation of another form of system;

Fig. 7 is a part section on the line VII—VII, Fig. 6;

Fig. 8 is an elevation of a damping device, and

Fig. 9 is a section on line IX—IX of Fig. 8.

As illustrated in Figs. 1 to 4, pump 1 supplies fluid through a duct 2 to a ball bearinged, rotary conical control plug valve 3 constituting a distribution valve capable of selectively supplying two or more working cylinders with pressure fluid and operated by a valve handle 4. From the valve 3 the fluid passes through a duct 5 which divides into two branches 6, 7. Branch 6 leads to a working cylinder 8 the piston of which is adapted—on being moved by oil pressure—to effect, for example, the closing of a vise or the moving of a rack in a machine tool, and branch 7 leads to and is screwed into a combined sequence and unloading valve 10. The volume of cylinder 8 is suitably controlled by means of a piston arrangement 11 having springs 12 attached to the ends of a rod 13 passing through the piston 11 and to lugs 14 on the cylinder 8, and an adjustable stop 15. The valve cylinder 16 communicates through a port 17 with a duct 18 which leads to a second working cylinder 19 the piston of which is adapted—on being moved by oil pressure—to effect, for example, the closing of a vise or the moving of a rack in a machine tool. The volume of cylinder 19 is suitably controlled by a piston 20 loaded by springs 21 attached to the ends of a bar 22 passing through the piston 20 and to lugs 23 on the cylinder 19. Valve cylinder 16 also communicates through port 24 with a discharge duct 25. The valve piston or plunger 26 has a hollow interior 27 which is closed by a screw plug 28 provided with a flange 29 shouldered at 30 and with a hemispherical recess 31 on its top. The valve piston 26 is provided with a lower series of ports or passage-ways 32 at 90° with each other leading into an external annular channel 33, and an upper series of ports or passage-ways 34 also at 90° with each other and leading into an external annular channel 35. The ported hollow piston 26 forms a combined sequence and unloading valve. In the recess 31 rests one end 36 of a hemispherical ended rod 37 of which the other end 38 rests in a hemispherical socket 39 formed on a lever 40. The lever 40 is pivoted at 41 on a fulcrum member 42 which is fixed at an angle of 60° with the vertical to the outside of the valve cylinder 16, and is provided with a stay 43 welded to the fulcrum member 42 at 44. An adjustable screw pin 45 is secured by a nut 46 to the end 47 of the lever 40 adjacent the fulcrum. The other end 48 of the lever 40 passes through an axial bore 49 of a slidably disposed cylindrical weight 50, which can be secured in position on the lever 40 by means of a screw 51. Through the wall adjacent the upper end of the valve cylinder 16 passes a downwardly sloping port 52 which allows atmospheric air to enter and leave the enlarged space 53 in the said end, above a shoulder 54 therein on which rests the shoulder 30 of the plug 28. A bellows 55 through which passes the rod 37 closes the said space 53. The valve 10 forms a pressure responsive valve wherein an exit port 17 is brought into communication, respectively, with an entry port or a port 24 open to atmosphere or the low pressure side of the hydraulic system automatically in accordance with the presence or absence of a predetermined fluid pressure in the supply port.

In use in the form illustrated in Figs. 1 to 4 on a predetermined pressure, controlled by the position of the adjustable weight 50 on the horizontal pivoted lever 40, being developed in the cylinder 8, the combined sequence and unloading valve piston 26 is forced upwards in its cylinder 16 and allows fluid to flow from duct 7 directly through port 17 to cylinders 19. The valve 10 permits cylinders 8 and 19 to operate in sequence. Valve 10 permits the fluid pressure in the second cylinder, namely cylinder 19, to be unloaded, i. e. released.

The piston 11 is moved to the right when the fluid pressure is supplied through the duct 6 and returns under the action of the springs 12 when the fluid pressure is released. The valve piston 26 is forced downwards by the weight of the weighted pivoted lever 40 until port 17 is connected by the ports or passage-ways 32, 34 through the valve piston 26 to the port 24 thereby allowing the fluid in the cylinder 19 to be exhausted since piston 20 is loaded by return springs 21, weights or the like. The pressure is released when the valve 3 is turned from the position shown in Fig. 1 to one of the other two ducts 5a, 5b extending from the valve casing 3 which opens to atmosphere or the low pressure side of the system, respectively, manually in Fig. 1 and automatically in Fig. 6.

Thus according to the invention means is provided whereby two cylinders 8, 19, can be operated one after the other from a single valve 3. This, according to the invention, is achieved by supplying the fluid pressure directly to the first cylinder 8 and through the intermediary of a pressure responsive valve 10 to the second cylinder 19. When the pressure is released the fluid from the first cylinder 8 returns through the operating valve 3 and the fluid from the second cylinder 19 returns through an aperture 24 associated with the pressure responsive valve 10; this is important because the fluid from the second cylinder 19 cannot return through the duct 7.

The flanged portion 30 of the valve piston 26 forms a stop for ensuring that the valve piston 26 registers the ports 32, 34 with the ports 17, 24 and the pin 45 on the pivoted lever 40 forms a stop for arresting the upward movements of the valve piston 26 when subjected to fluid pressure.

In Fig. 5, a modified form of valve piston or plunger 56 is illustrated wherein the centre of the valve is solid and the valve ports are combined to form a broad annular recess 57a which in the upper position of the valve registers simultaneously with ports 17 and 24.

In Figs. 6 and 7, the valve 3 is disposed in the branch 6 of the duct 2 leading from pump 1 after the said duct 2 has branched into ducts 6', 6 and 7, and between the point of branching and the cylinder 8. The valve 3 has a ratchet wheel 57 fixed to it having the same number of teeth 58 as there are ports 59 in the rotary valve 3. With the ratchet wheel 57 there engages a pawl 60 loaded by a spring 61, fitted to a piston 62 sliding in a secondary cylinder 63. The outward stroke of piston 62 is limited by a stop 64, which limits the movement of the piston 62 to a distance equal to the length of the chord from one ratchet tooth 58 to the next, the return stroke of said piston being effected by a spring 65 of which one end is secured to the piston 62 and the other to the cylinder 63. A port 66 in the end of the cylinder 63 remote from pawl 60 is connected to the duct 18 leading from the cylinder of the valve 10.

In operation when an increase in pressure in the fluid, i. e. hydraulic system occurs, as caused by a working piston 11 reaching a limit stop 15 in a portion of the fluid system which is exposed to fluid pressure through the position of the distributor valve port, the valve piston 26 is forced upwards and exposes piston 62 to fluid pressure and its movement turns the ratchet wheel 57 one tooth 58. This action turns the rotary valve 3 to the next port. Pressure from cylinder 8 is released through pipe 6 and valve 3. When used as in Fig. 6, in function, the weight 50 is adjusted on the bar 40 such that the pressure exerted thereby on the valve piston 26 will overcome the resistance of piston 11 or any other piston and cylinder connected to the pipe 6 of the rotary valve (except when the piston 11 reaches its stop 15). Thus the piston valve can return downwards until it is positioned by the flange 30 contacting the shoulder 54. When used as in Fig. 6, as a combined sequence and unloading valve it closes by the removal of fluid pressure from the system by rotating the valve 3 to connect the pipe 6 to zero pressure (pump supply tank). That is to say, the fluid pressure in the cylinder 8 is thus allowed to drop below the setting of the weight 50 on the horizontal pivoted lever arm 40, since the arm 40 is adjusted to operate only at a fluid pressure in excess of that required by other portions of the fluid system. The valve piston 26 is thereby allowed to fall, and the piston 62 to return under the action of its return spring 65, since the fluid displaced by the piston 62 is removed out of the system by the connection of the ports 17 to 24 through the passage-ways 32, 34 of the valve piston 26. A cut-off valve 67 may be provided in the circuit and adapted to cut off the supply whilst the distributor valve is indexed from one station to another. Valve 67 is operated by a spring loaded stem 68, Fig. 7, engaging a notched disc 69 on the body of valve 3. Notches 70 on disc 69 are so shaped as to allow an instantaneous opening of valve 67 when valve 3 is aligned to a new position. By this arrangement a more positive action of the indexing mechanism is achieved.

Valve 3 is further provided with a disc 71 which carries adjustable cam points 72 which are adapted to engage successively an operating member 73 which is arranged to vary the output of pump 1. By this arrangement the pump output may be varied in accordance with the setting of valve 3 to suit the requirements of the different operating cylinders served by valve 3.

This device provides automatic rotation of a rotary distribution valve by pressure variation in the fluid system and provides a convenient automatic method of serving successively the working cylinders of a hydraulic system.

Under some working conditions, the arm 40 may not readily remain in its lifted position and engages in the kind of uncontrolled oscillation usually referred to as hunting which prevents the valve piston from remaining in its raised position. A device to overcome this difficulty is illustrated in Figs. 8 and 9 of the drawings and embodies a damping device 80 comprising a plunger 81 slidably mounted in an aperture in one end of the arm 40 and urged by a spring 82 to frictionally engage an arcuate face 83 of a member 84 which is secured in position to a bracket 85 by bolts 86. The arcuate face 83 is normally concentric with the centre of the pin 41. A slot 87 is provided in the bracket 85 to enable the member 84 to be moved relative to the plunger 81 for varying the degree of pressure of engagement therewith. A slot 88 is provided in the member 84 to enable the member to be tilted relative to the plunger 81 so that an increasing amount of friction may be brought about towards one end of the arcuate path of the plunger 81. In operation, should the fluid pressure in the tube 7 build up suddenly, the valve piston 20 may raise the arm 40 and the weight 50 so rapidly that the latter may, under their own momentum, lift off the rod 37. If, thereafter, the arm 40 falls back onto the rod 37, the momentum of the fall may lower the piston 20 and then commence the said undesirable hunting of the valve for its required setting. By means of the frictional resistance which the member 84 presents to the arm 40, the movement of the latter is damped and hunting is eliminated.

What I claim and desire to secure by Letters Patent is:

1. A fluid pressure operated system comprising, in combination, a plurality of operational reciprocating fluid motors, an auxiliary reciprocating fluid motor having a fluid pressure actuated working stroke and a spring or gravity actuated idle return stroke; a fluid-supplying pump; a main duct leading from said pump and provided with a rotary control valve having an exteriorly accessible shaft and having a plurality of operational positions for selectively admitting pressure fluid from the pump to branch ducts leading from the control valve to the operational motors and permitting the return of the fluid from a selected operational motor to atmosphere; an auxiliary duct leading from the main duct to the auxiliary motor; a fluid pressure-responsive valve in the auxiliary duct for admitting pressure fluid from the main duct to the auxiliary motor when the control valve is set to admit pressure fluid to a selected operational motor and the fluid pressure in the main duct rises and exceeds a predetermined maximum on account of the selected operational motor meeting a stop provided for that purpose on completion of its stroke and permitting the return of the fluid from the auxiliary motor to atmosphere when the fluid pressure in the main duct falls below the said maximum on account of the control valve being set to permit the return of the fluid from the selected operational motor to atmosphere; a one-way detent having a driving member associated with the auxiliary motor and a driven member secured to the shaft of the control valve, so that during the working stroke of the auxiliary motor the control valve is rotated to a position connecting the operational motor, whose stroke has been completed, to atmosphere and connecting another operational motor to the main duct, while during the return stroke of the auxiliary motor the control valve remains undisturbed.

2. A fluid pressure controlled system according to claim 1 wherein, between the control valve and the juncture of the main and auxiliary ducts, the main duct is provided with a shut-off valve having an exterior operating member cooperating with a cam secured to the shaft of the control valve, the cam being timed with the operation of the control valve so that, when the control valve is rotated by the auxiliary motor, the supply of fluid to the control valve is shut off by the shut-off valve and is not established again until the control valve has reached its new operative position.

3. A fluid pressure controlled system according to claim 1, in which means is provided for varying the pump output, said means having an operating member, and cam means secured to the shaft of the control valve adapted to cooperate with said operating member to vary the pump output automatically in accordance with the setting of the control valve.

4. A fluid pressure controlled system according to claim 1, in which the fluid pressure-responsive valve includes a valve piston which is provided with a damping device for retarding movement thereof.

5. A fluid pressure controlled system according to claim 4, wherein said damping device comprises a friction brake and said piston has a weighted pivotal horizontal lever coacting with said brake.

6. A fluid pressure controlled system according to claim 5, in which the friction brake includes a stationary member having an arcuate surface and said lever has a spring loaded element in contact with such arcuate surface, the arcuate surface having a radius centered on the pivotal center of the lever.

7. A fluid pressure controlled system according to claim 6, in which the stationary member adjustable with respect to the pivotal plane of the lever to a position eccentric to the pivotal center of said lever.

References Cited in the file of this patent

UNITED STATES PATENTS

| Number | Name | Date |
|---|---|---|
| 67,719 | Burr | Aug. 13, 1867 |
| 446,799 | Thorpe | Feb. 17, 1891 |
| 2,153,637 | Niven et al. | Apr. 11, 1939 |
| 2,301,028 | Esch | Nov. 3, 1942 |

FOREIGN PATENTS

| Number | Country | Date |
|---|---|---|
| 87 | Great Britain | Jan 10, 1863 |